United States Patent Office

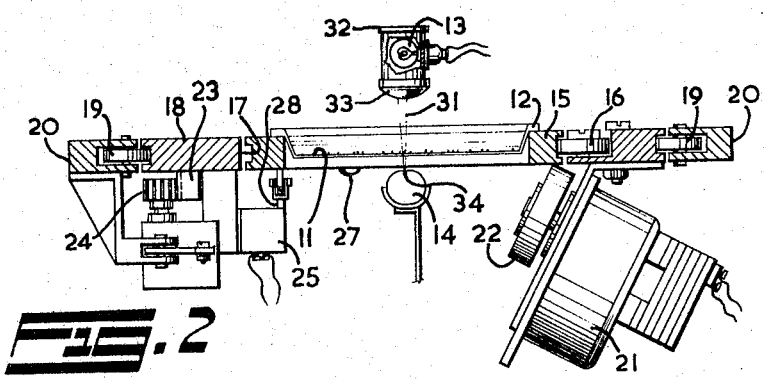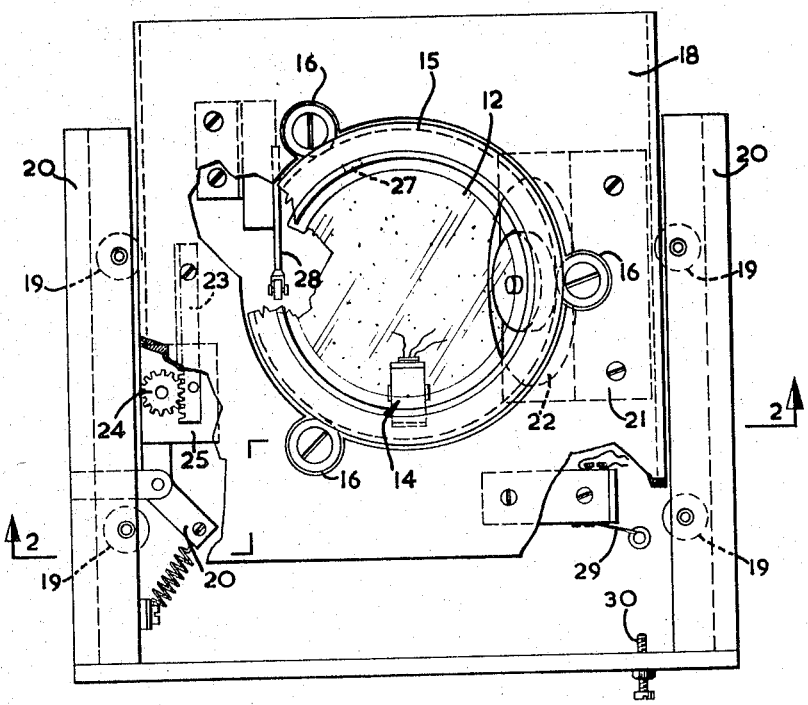

3,299,256
Patented Jan. 17, 1967

3,299,256
AUTOMATIC COUNTING DEVICE FOR
COUNTING PARTICLES
Charles Howe, Bramhall, and James W. Abson, Cheadle Heath, Stockport, England, assignors to Simon-Carves Limited, Cheadle Heath, Stockport, England, a British company
Filed Mar. 20, 1963, Ser. No. 266,669
Claims priority, application Great Britain, Mar. 30, 1962, 12,454/62
8 Claims. (Cl. 235—92)

This invention relates to automatic counting and/or recording devices and in particular, although not exclusively, to devices for automatically counting and/or recording the number of bacterial colonies in a given quantity of solid culture media. In addition to the above application, however, the device may be used for other counting and/or recording functions such, for instance, as that of counting and/or recording the number of solid particles in a sample of a liquid suspension. It will be appreciated that the device will not function to discriminate between particle or colony sizes.

According to the invention an automatic counting and/or recording device comprises means to direct a concentrated light beam upon a light-responsive device, means to rotate a transparent container containing matter to be counted and/or recorded in a circular horizontal path between said light beam and said light-responsive device, and means to advance said container in a linear direction at the end of each complete revolution thereof; the intensity of the light falling on said light-responsive device being varied in accordance with variations in the density of the matter passing through said light beam and said variations in intensity being adapted to actuate a counting and/or recording means.

It will be appreciated that the light-sensitive device may be arranged to operate the counting and/or recording device in response either to an increase or a reduction in the beam intensity as related to a predetermined norm (established when the light beam is interrupted only by a transparent carrier).

In one exemplary form of the invention, the device is adapted to count and/or record the number of colonies of bacteria in a solid sample of culture media.

But a better understanding of the invention may be obtained from the following description when this is read with reference to the accompanying drawings, of which:

FIGURE 1 is a top plan, partly broken view, of one construction of a device according to the invention, and FIGURE 2 is a section on the line 2—2 of FIGURE 1.

A measured quantity of a culture 11, is distributed about the base of a glass petri dish 12, and is solidified, as by the addition of agar. The petri dish 12, is then placed between a light source 13 and a light-responsive device 14 so that the number of colonies in the culture may be counted and/or recorded.

For this purpose, a petri dish ring 15 is rotatably engaged by low friction bearings 16 in an aperture 17 in a supporting plate 18 and is rotatable therein. The supporting plate 18 is engaged by low friction bearings 19 for movement backwards and forwards in a linear direction within a supporting framework 20.

A suitable electric motor and reduction gearbox 21 is secured beneath the supporting plate 18; the output shaft of the gear box having friction driving means 22 secured thereto. These friction means 22 are in engagement with the underside of the petri dish ring 15 so that when the motor is operating the friction driving means 22 will rotate the petri dish ring 15 in the supporting plate 18 and will thus rotate the petri dish 12 located in that ring. The rotational speed of the petri dish ring 15 will be constant and will be any required speed between, say, 2 r.p.m. and 20 r.p.m. depending upon the sample to be counted and/or recorded and upon the sensitivity and speed of operation of the counting and/or recording device.

The supporting plate 18 has secured to its underside a toothed rack 23 disposed parallel with the direction of linear movement of the plate 18 and at one of its longitudinal edges and this rack 23 is engaged by a pinion 24 actuated by an electromagnetic step-by-step escapement mechanism 25 in such a manner that when the electromagnet is energised the supporting plate 18 is moved forward by one "step" (as will later be seen), carrying with it the petri dish ring 15 and the petri dish 12 supported thereby. The light source 13 and light responsive device 14 do not move, and the beam thus passes through the petri dish on a number of concentric circles of diminishing diameter.

The electromagnetic escapement mechanism 25 and pinion are mounted on a spring-loaded bell crank 26 so that the pinion 24 is normally spring-urged into engagement with the rack 23 but can be disengaged to allow the plate 18 to be moved freely in the reverse direction to that in which it is moved by the escapement 25.

A cam 27 or other like switch-closing device is secured to one portion of the petri dish ring 15 so that as the ring 15 completes each revolution it closes a switch 28 to energise the electromagnetic escapement 25 and move the supporting plate 18 forward by one step.

A further switch 29 on the plate 18 is adapted to be contacted by an adjustable stop 30 in the frame 19 of the device so that when the supporting frame 18 has moved forward the required number of steps the switch 29 is opened and the motor 21 rotating the petri dish ring 15 is de-energised and the rotation and counting and/or recording ceases.

The light-sensitive device 13 is preferably a phototransistor, contained within the holder 14 secured to the frame 19 of the device beneath the plate 18, and connected into a suitable electronic amplifying circuit (not shown) in such a manner that changes in the intensity of the beam of light falling on the photo-transistor operate a suitable counting and/or recording device connected into the circuit.

The light source 13 is held in a container 32 secured to the frame 19 above the plate 18 and comprises a suitable electric bulb, the illumination from which is focussed through a suitable lens 33 upon a hole 34 in the holder of the photo-transistor. The sensitivity of the device may be adjusted by altering the intensity of the light beam 31 by means of an iris diaphragm or by a suitable variable resistance (not shown) in series with the bulb 13 and/or by varying the size of the hole 34 in the phototransistor holder 13 or, in either case, by any other suitable known means.

In operating the device the sample to be analyzed is placed in a petri dish 12 and is evenly distributed over its base. The petri dish 12 is then placed in the petri dish ring 15, the pinion 24 is released from the rack 23, and the platform 18 is moved back until the beam 31 from the light source 13 falls on the base of the petri dish 12 as close to its rim as possible. The driving motor 21 is then energized and the petri dish ring 15 is caused to rotate. The petri dish 12 then rotates through the light beam 31 and as the bacterial colonies or the solid particles in the sample of suspension pass beneath the beam they interrupt, or decrease, the intensity of the beam 31 falling on the photo-transistor, which is so connected with the counter and/or recording device (not shown) that each interruption of the beam 31 causes an operating pulse to be imposed upon the counter and/or recording device.

As the petri dish ring 15 rotates, the cam 27 or the like on its periphery closes the escapement switch 28 which then operates to engage the pinion 24 with the rack 23 and rotate the pinion by one stage or step. The engagement of the pinion 24 with the rack 23 also causes the plate 18 to move by an equivalent amount to bring another portion of the petri dish 12 beneath the beam 31. The petri dish ring 15 continues to rotate with the beam 31 passing therethrough on a circle, concentric with the first one, but of slightly lesser diameter and the count and/or record is taken of the colonies or particles lying on the circumference of this circle.

This operation is repeated at each complete revolution of the petri dish ring 15 until the plate 18 has been moved so that its switch 29 engages the adjustable stop 30. At this point, the motor 21 and light source 13 are deenergized and the petri dish ring 15 ceases to rotate.

The distance the plate 18 will move at each operation of the escapement 25 is previously determined and so the number of concentrically circular paths upon which the count has been taken during the operation of the device is known. By a simple formula of calculation known in the art it can thus be determined within close tolerances how many colonies or particles are present in the sample counted and/or recorded; the volume of the sample being already known.

Means may be provided for the adjustment of the movement of the plate 18 caused by the escapement 25 so that the number of complete circles traversed by the petri dish ring 15 may be related either to the size of the colonies or particles to be counted or to the degree of accuracy required in the count.

Any known type of electric pulse-operated counting and/or recording device may be used, either alternatively or in combination. For example, a known cyclometer-type of counting mechanism may be used alternatively with, or in combination with, a device operable to mark or punch a moving tape. Other suitable devices of either type will be obvious to those skilled in the art.

What we claim is:

1. An automatic counting and/or recording device, comprising means to direct a concentrated light beam upon a light-responsive device, means to rotate a transparent container containing matter to be counted and/or recorded in a circular horizontal path between said light beam and said light-responsive device, and means periodically operable to advance said container a predetermined distance in a linear direction at the end of each complete revolution thereof; the intensity of the light falling on said light-responsive device being varied in accordance with variations in the density of the matter passing through said light beam and said variations in intensity being adapted to actuate a counting and/or recording device.

2. A device according to claim 1, wherein said transparent container comprises a petri dish located in an annular ring and friction means are provided to rotate said petri dish and said ring in a substantially-horizontal plane.

3. A device according to claim 2, wherein said annular ring is rotatably mounted in a supporting plate and said plate is adapted to be moved in successive steps of a predetermined amplitude in one linear direction during rotation of said annular ring.

4. An automatic counting and/or recording device comprising a support, a carrier member mounted for substantially horizontal linear movement upon said support, a transparent member having a surface disposed substantially in a horizontal plane and adapted to receive matter to be counted and/or recorded, means mounting said transparent member on said carrier member for rotation in the plane of said surface, means for continuously rotating said transparent member mounting means, periodically operable means for moving said carrier member in a predetermined direction in successive steps synchronized with one or more complete revolutions of said surface, and measuring means comprising means projecting a light beam along a fixed axis through said surface and light responsive means in the path of said beam passing through said transparent member, whereby successive annular regions of said surface are scanned by said measuring means.

5. The device defined in claim 4, wherein said mounting means for the transparent member is a ring, and said ring carrier means for actuating said periodically operable carrier member moving means during each revolution of said ring.

6. An automatic counting and/or recording device comprising a rigid framework, means to direct a concentrated light beam upon a light-responsive device, an annular ring mounting a petri dish having a substantially horizontal transparent surface containing matter to be counted and/or recorded for rotation in the plane of said surface between said light beam and said light-responsive device, means for rotating said ring and said petri dish, means to advance said ring and petri dish in a linear direction at the end of a complete revolution thereof comprising means rotatably mounting said ring in a supporting plate linearly movably mounted on said framework, means for moving said plate in successive steps of a predetermined amplitude in one linear direction at the end of a complete rotation of said annular ring comprising a toothed rack secured to said plate and a rotatable toothed pinion mounted on said framework and spring-loaded into engagement with said rack, electro-magnetic means associated with said pinion and adapted to cause the partial rotation thereof upon energization of said electro-magnetic means, a cam on said annular ring and a switch for said electro-magnetic means; said cam being adapted to close said switch and energize said electro-magnetic means to cause partial rotation of said pinion once in every complete revolution of said annular ring; whereby to cause the step by step linear movement of said supporting plate once at each said revolution, the intensity of the light falling on said light-responsive device being varied in accordance with variations in the density of the matter passing through said light beam and said variations in intensity being adapted to actuate a counting and/or recording device.

7. A device according to claim 6, comprising a limit switch attached to said supporting plate and an adjustable stop member attached to the rigid supporting structure of said device; said switch being adapted to engage and be opened by said stop member to disconnect the electric current to said light beam and said light-responsive device when said plate has been moved linearly in one direction for the required distance.

8. A device according to claim 7, wherein said means to rotate the transparent container comprise an electric motor, a speed reduction gear box and friction means adapted to engage said annular ring, and said limit switch is also adapted to deenergize said motor.

References Cited by the Examiner

UNITED STATES PATENTS

| | | | |
|---|---|---|---|
| 2,584,052 | 1/1952 | Sandorff et al. | 235—92 |
| 2,661,902 | 12/1953 | Wolff et al. | 235—92 |
| 2,947,877 | 8/1960 | Stoate | 235—92 |

DARYL W. COOK, *Acting Primary Examiner.*

J. F. MILLER, *Assistant Examiner.*